United States Patent
Lee et al.

(10) Patent No.: US 9,633,259 B2
(45) Date of Patent: Apr. 25, 2017

(54) APPARATUS AND METHOD FOR RECOGNIZING IRIS

(71) Applicant: Hyundai Motor Company, Seoul (KR)

(72) Inventors: Jae Ho Lee, Gyeonggi-do (KR); Seon A Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/845,313

(22) Filed: Sep. 4, 2015

(65) Prior Publication Data
US 2016/0104043 A1    Apr. 14, 2016

(30) Foreign Application Priority Data
Oct. 10, 2014    (KR) .................. 10-2014-0136641

(51) Int. Cl.
*G06K 9/46*    (2006.01)
*G06K 9/00*    (2006.01)

(52) U.S. Cl.
CPC ....... *G06K 9/00604* (2013.01); *G06K 9/0061* (2013.01)

(58) Field of Classification Search
CPC .................................................. G06K 9/0061
See application file for complete search history.

(56) References Cited

U.S. PATENT DOCUMENTS

| 2006/0147094 | A1 | 7/2006 | Yoo |
| 2007/0160308 | A1* | 7/2007 | Jones ................ G06K 9/0061 382/260 |
| 2008/0159600 | A1 | 7/2008 | Cho |

FOREIGN PATENT DOCUMENTS

| KR | 10-2004-0048520 A | 6/2004 |
| KR | 10-2005-0025927 A | 3/2005 |
| KR | 10-2005-0044073 A | 5/2005 |
| KR | 10-2011-0121874 A | 11/2011 |
| KR | 10-2012-0089527 A | 8/2012 |

OTHER PUBLICATIONS

R. Donida Labati, and F. Scotti, "Noisy iris segmentation with boundary regularization and reflections removal", in Image and Vision Computing, Iris Images Segmentation Special Issue, Elsevier, pp. 270-277, Feb. 2010.*

* cited by examiner

*Primary Examiner* — Brian P Werner
(74) *Attorney, Agent, or Firm* — Mintz Levin Cohn Ferris Glovsky and Popeo, P.C.; Peter F. Corless

(57) ABSTRACT

An apparatus for recognizing an iris includes: a camera configured to acquire eyeball image data; and a control module configured to estimate the iris based on pupil information extracted from the eyeball image data, acquire at least one candidate boundary line for confirming the iris based on the estimated iris, and select a final boundary line from the at least one candidate boundary line. The iris is recognizable according to the final boundary line.

9 Claims, 5 Drawing Sheets

(a)

(b)

(c)

(d)

APPARATUS AND METHOD FOR RECOGNIZING IRIS

CROSS-REFERENCE TO RELATED APPLICATION

This application claims the benefit of and priority to Korean Patent Application No. 10-2014-0136641, filed on Oct. 10, 2014 in the Korean Intellectual Property Office, the disclosure of which is incorporated herein in its entirety by reference.

TECHNICAL FIELD

The present disclosure relates generally to an apparatus and a method for recognizing an iris, and more particularly, to an apparatus and a method for recognizing an iris capable of detecting an iris boundary line from eyeball image data.

BACKGROUND

Traditional methods of identifying an individual include using a personal code, a personal identification number (PIN), etc. However, these methods may not meet current demands for stably and accurately identifying an individual, particularly in an information-based society in which risks of illegal use are becoming more sophisticated In particular, with the rapid development of the Internet, e-commerce, and the like, relying on traditional methods for authenticating an individual can result in significant loss.

Biometrics represents an alternative method of authentication which may supplement the traditional authentication methods. Common biometrics techniques include recognizing a fingerprint, a face, an iris, and the like, of an individual. In particular, iris recognition is effective in terms of uniqueness, invariability, and stability in identifying an individual. Therefore, iris recognition is frequently applied in fields which require a high level of security. However, the accuracy of iris recognition may decrease due to an illumination glint which is generated by illumination reflecting from the iris.

SUMMARY

The present disclosure has been made to solve the above-mentioned problems occurring in the related art while advantages achieved by the related art are maintained intact.

An aspect of the present disclosure provides an apparatus and a method for recognizing an iris capable of acquiring candidate boundary lines of the iris using a method for detecting a candidate boundary line and then confirming an iris boundary line among the candidate boundary lines.

According to embodiments of the present disclosure, an apparatus for recognizing an iris includes: a camera configured to acquire eyeball image data; and a control module configured to estimate the iris based on pupil information extracted from the eyeball image data, acquire at least one candidate boundary line for confirming the iris based on the estimated iris, and select a final boundary line from the at least one candidate boundary line. The iris is recognizable according to the final boundary line.

The control module may be further configured to apply a thresholding scheme to the eyeball image data to extract a pupil area.

The control module may be further configured to apply a candidate boundary line detection scheme to the eyeball image data to acquire a boundary line map for the iris.

The control module may be further configured to remove noise from the boundary line map to acquire the at least one candidate boundary line.

The control module may be further configured to confirm a central point of the pupil and calculate a vector inner product of a central point of the pupil and the at least one candidate boundary line to select a candidate boundary line having a largest average value of the vector inner product among the at least one candidate boundary line as the final boundary line.

Furthermore, according to embodiments of the present disclosure, a method for recognizing an iris includes: acquiring eyeball image data; extracting pupil information from the eyeball image data; estimating the iris based on the pupil information; acquiring at least one candidate boundary line for confirming the iris based on the estimated iris; selecting a final boundary line from the at least one candidate boundary line; and recognizing the iris according to the final boundary line.

The extracting of the pupil information may include extracting a pupil area by applying a thresholding scheme to the eyeball image data.

The acquiring of the at least one candidate boundary line may include: applying a candidate boundary line detection scheme to the eyeball image data; and acquiring a boundary line map for the iris, and in the acquiring of the at least one candidate boundary line.

The method may further include removing noise from the boundary line map.

The selecting of the final boundary line may include: confirming a central point of the pupil; calculating a vector inner product of the central point of the pupil and the at least one candidate boundary line; selecting a candidate boundary line having a largest average value of the vector inner product among the at least one candidate boundary line as the final boundary line.

Furthermore, according to embodiments of the present disclosure, a non-transitory computer readable medium containing program instructions recognizing an iris includes: program instructions that extract pupil information from acquired eyeball image data; program instructions that estimate the iris based on the pupil information; program instructions that acquire at least one candidate boundary line for confirming the iris based on the estimated iris; program instructions that select a final boundary line from the at least one candidate boundary line; and program instructions that recognize the iris according to the final boundary line.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

Figure 1:
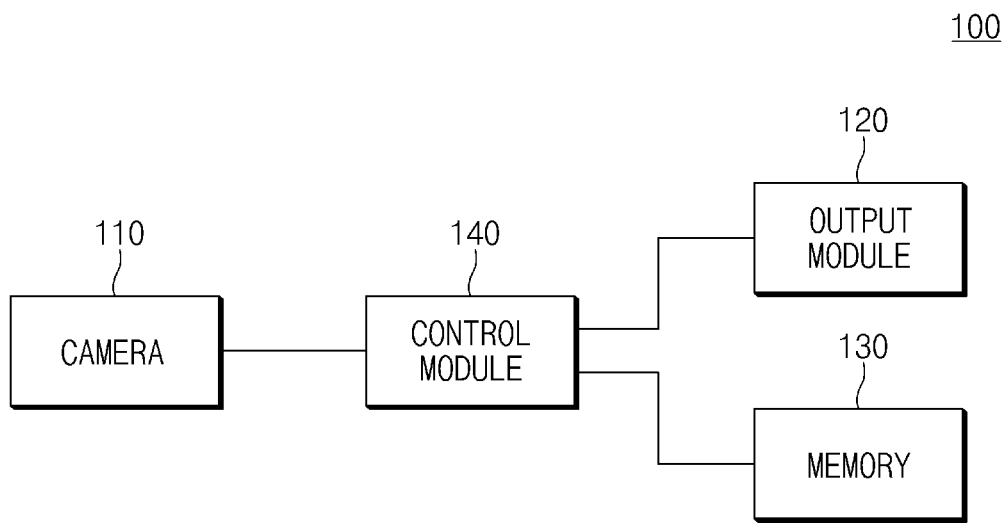
FIG. 1 is a diagram illustrating main components of an apparatus for recognizing an iris according to embodiments of the present disclosure.

Hereinafter, various embodiments of the present disclosure will be described with reference to the accompanying drawings. The embodiments of the present disclosure may be variously changed and variously practiced, but specific embodiments are illustrated in the accompanying drawings and detailed contents thereof will be described. However, it is to be understood that various embodiments of the present disclosure are not limited to the disclosed embodiments, but include all modifications, equivalents, and substitutions included in the spirit and the scope of the present disclosure. In describing the drawings, like components are denoted by like reference numerals.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that one or more of the below methods, or aspects thereof, may be executed by at least one control module. The term "control module" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control module in conjunction with one or more other components, as would be appreciated by a person of ordinary skill in the art.

Furthermore, the control module of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a diagram illustrating main components of an apparatus for recognizing an iris according to embodiments of the present disclosure.

As shown in FIG. 1, an apparatus 100 for recognizing an iris according to embodiments of the present disclosure may acquire eyeball image data and extract a pupil (e.g., pupil information) from the eyeball image data. The apparatus 100 for recognizing an iris may estimate the iris based on the extracted pupil information and acquire at least one candidate boundary line. The apparatus 100 for recognizing an iris may select a final boundary line from at least one candidate boundary line to recognize the iris. To this end, the apparatus 100 for recognizing an iris may include a camera 110, an output module 120, a memory 130, and a control module 140.

The camera 110 may acquire the eyeball image data including an eyeball by a control of the control module 140. The camera 110 may provide the acquired eyeball image data to the control module 140. For this purpose, the camera 110 may be an infrared camera for acquiring infrared image data, for example.

The output module 120 may output a screen at the time of an operation of the apparatus 100 for recognizing an iris by the control of the control module 140 and output the eyeball image data acquired by the camera 110. For this purpose, the output module 120 may be configured of output apparatuses such as an LCD and a touch screen, for example.

The memory 130 may store programs, and the like for running the apparatus 100 for recognizing an iris. In particular, the memory 130 may store thresholding algorithm for extracting a pupil area from the eyeball image data. The memory 130 may store a candidate boundary line detection algorithm which may acquire the candidate boundary lines of the iris from the eyeball image data and an algorithm for calculating vector inner product values with a central point of the pupil and the candidate boundary line algorithm.

The control module 140 may control the camera 110 to acquire the eyeball image data including an eyeball. The control module 140 may analyze the acquired eyeball image data to extract the pupil area from the eyeball image data. According to embodiments of the present disclosure, the control module 140 may extract the thresholding algorithm stored in the memory 130 to extract the pupil area from the eyeball image data which are the infrared image data. The control module 140 may estimate the iris based on the extracted pupil area. For example, the control module 140 may estimate the iris under the assumption that the center of the extracted pupil area is the center of the iris.

The control module 140 may also acquire the candidate boundary lines of the iris based on the estimated iris. According to embodiments of the present disclosure, the control module 140 may extract the candidate boundary line detection algorithm stored in the memory 130 to acquire a boundary line map from the eyeball image data. The control module 140 may extract a clustering algorithm stored in the memory 130 to remove noise from the acquired boundary line map and detect the candidate boundary lines of the iris. In this case, the control module 140 may apply a contour detection algorithm of open CV instead of the clustering algorithm.

The control module 140 may also calculate the vector inner product with the acquired candidate boundary line of the iris and the central point of the pupil based on the following Equation 1 to select the final boundary line. This may be similar to a principle of a process of finding out an arc in the state in which a center (e.g., central point of the pupil) of a circle is known. In this case, a maximum value of inner product values of vectors $C_i$ for each point $e_i$ of a boundary line of a circle from a central point c of the circle and normal vectors $E_i$ for each point $e_i$ may be 1. When the c is not the central point of the circle, an inner angle is present between the $C_i$ and the $E_i$, and therefore the inner product value may be reduced.

$$e_i^* = \text{argmax}_{e_i} \left\{ \frac{1}{N} \sum_{i=1}^{N} (C_i^T E_i)^2 \right\}$$

$$\left( C_i = \frac{e_i - c}{\|e_i - c\|_2}, \|E_i\|_2 = 1 \right)$$

[Equation 1]

The control module 140 may also calculate the vector inner product values with the central point of the pupil and each candidate boundary line based on the above Equation 1 and select the candidate boundary line having the largest average value among average values of the calculated vector inner product values as the final boundary line of the iris. The control module 140 may use the selected final boundary line to recognize the iris based on the eyeball image data.

Figure 2:
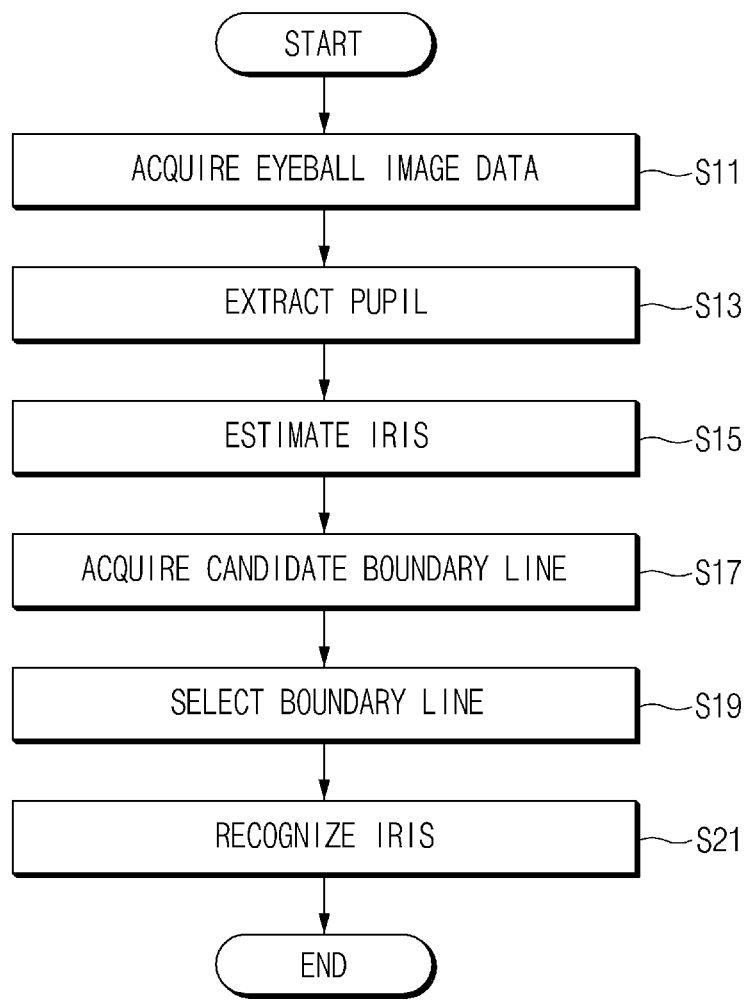
FIG. 2 is a flow chart for describing a method for recognizing an iris according to embodiments of the present disclosure.
Figure 3:
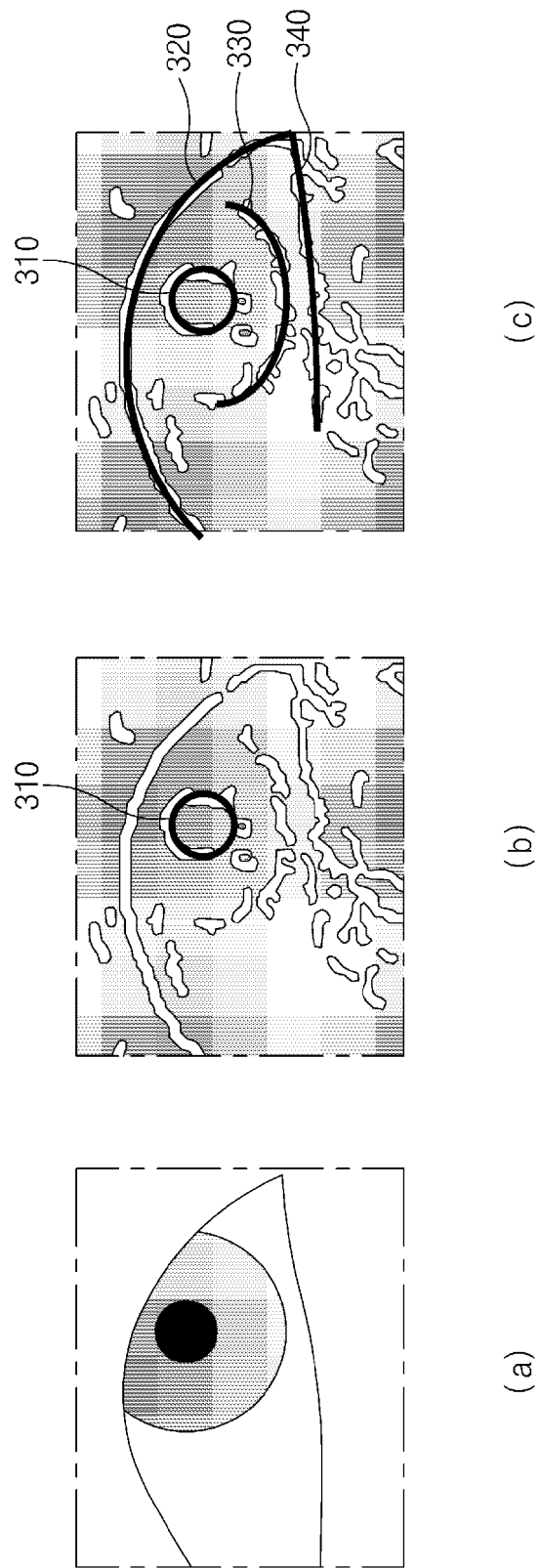
FIG. 3 includes diagrams for describing a method for acquiring candidate boundary lines of an iris according to embodiments of the present disclosure.
Figure 4:
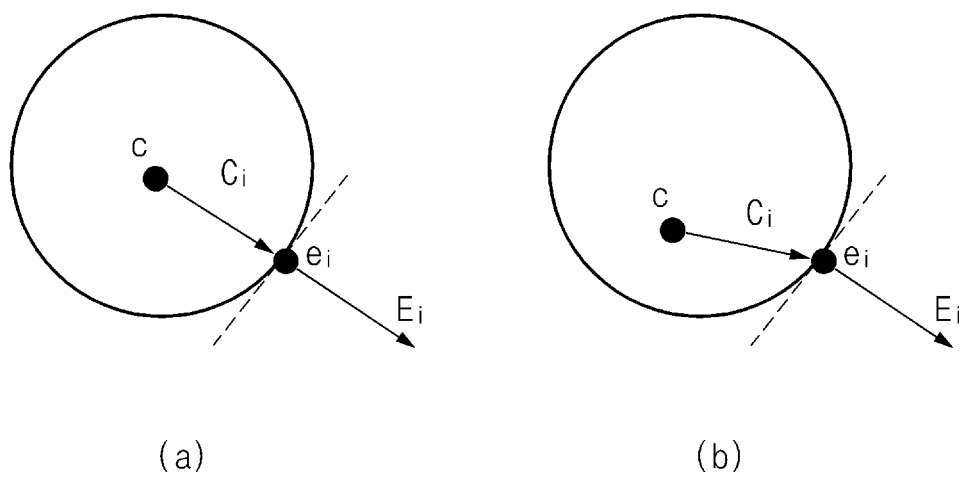
FIG. 4 includes diagrams for describing a calculation of a vector inner product with a central point of a pupil according to embodiments of the present disclosure.
Figure 5:
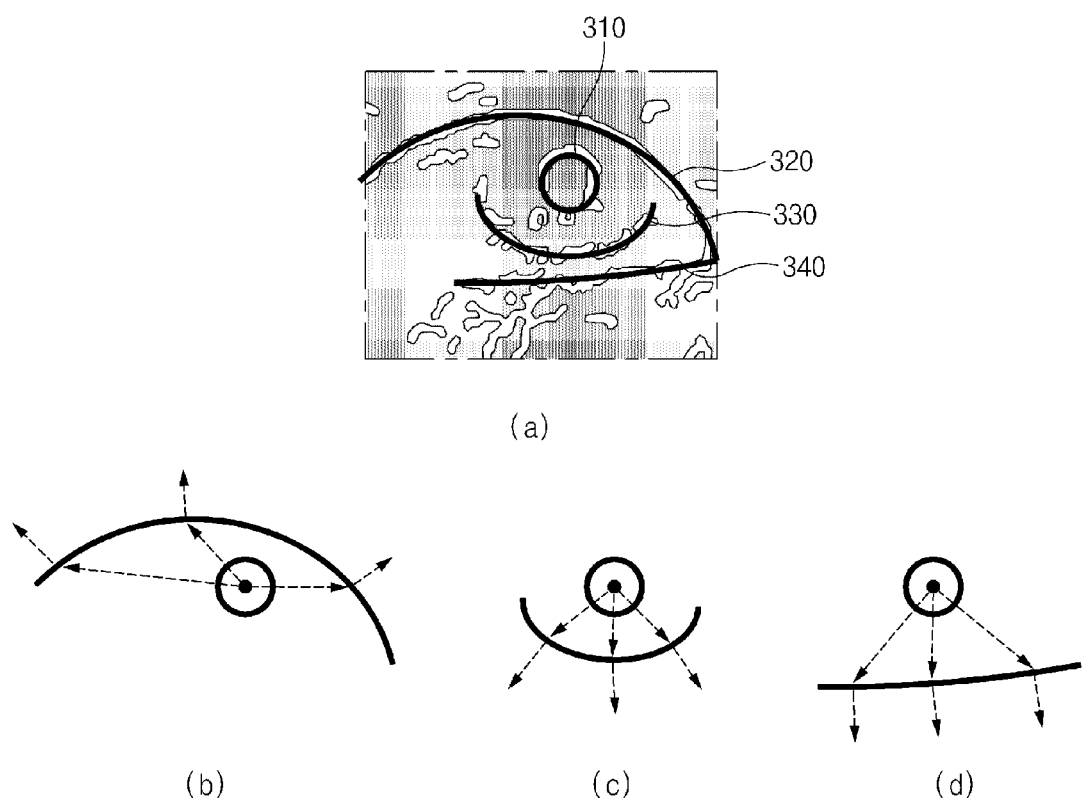
FIG. 5 includes diagrams for describing a method for selecting a final boundary line from candidate boundary lines of an iris according to embodiments of the present disclosure.

FIG. 2 is a flow chart for describing a method for recognizing an iris according to embodiments of the present disclosure. FIG. 3 includes diagrams for describing a method for acquiring candidate boundary lines of an iris according to embodiments of the present disclosure. FIG. 4 includes diagrams for describing a calculation of a vector inner product with a central point of a pupil according to embodiments of the present disclosure. FIG. 5 includes diagrams for describing a method for selecting a final boundary line from candidate boundary lines of an iris according to embodiments of the present disclosure.

Referring to FIGS. 1 to 5, in step S11, the control module 140 may control the camera 110 to acquire the eyeball image data including the eyeball. In step S13, the control module 140 may analyze the acquired eyeball image data to extract the pupil area from the eyeball image data. According to embodiments of the present disclosure, the control module 140 may apply a thresholding scheme to the eyeball image data which are the infrared image data to extract the pupil area.

In step S15, the control module 140 may estimate the iris based on the extracted pupil area. For example, the control module 140 may estimate the iris under the assumption that the center of the extracted pupil area is the center of the iris.

In step S17, the control module 140 may acquire the candidate boundary lines of the iris based on the estimated iris. According to embodiments of the present disclosure, the control module 140 may apply the candidate boundary line detection scheme to the eyeball image data to acquire the boundary line map. The control module 140 may apply a clustering algorithm to the acquired boundary line map to remove noise and the candidate boundary lines of the iris. This may be represented as in FIG. 3. The control module 140 may apply the candidate boundary line detection scheme to the eyeball image data as illustrated in (a) of FIG. 3 to acquire the boundary line map of the iris of (b) of FIG. 3. The control module 140 may apply the clustering algorithm to the detected candidate boundary line map of the iris as illustrated in (b) of FIG. 3 to detect candidate boundary lines 320, 330, and 340 of an iris as illustrated in (c) of FIG. 3. Meanwhile, (c) of FIG. 3 illustrates the candidate boundary lines of the iris as three candidate lines 320, 330, and 340 for convenience of explanation and therefore, it is to be noted that the candidate boundary lines are not necessarily limited thereto.

In step S19, the control module 140 may calculate the vector inner product of the acquired candidate boundary lines 320, 330, and 340 of the iris and the central point of the pupil to select the final boundary line. According to embodiments of the present disclosure, the control module 140 may calculate the vector inner product value of the central point c of the pupil and the candidate boundary lines 320, 330, and 340 as illustrated in FIG. 4. This is represented by the above Equation 1. This may be similar to a principle of the process of finding out an arc in the state in which the center (e.g., central point c of the pupil) of the circle is known. In this case, a maximum value of inner product values of vectors $C_i$ for each point $e_i$ of a boundary line of a circle from a central point c of the circle illustrated in (a) of FIG. 4 and normal vectors $E_i$ for each point $e_i$ may be 1. As illustrated in (b) of FIG. 4, when the c is not positioned at the central point of the circle, an inner angle is present between the $C_i$ and the $E_i$ and therefore the inner product value may be reduced.

As illustrated in (a) of FIG. 5, the vector inner product value may be calculated by the method as illustrated in (b), (c), and (d) of FIG. 5 using the above Equation 1 in the state in which the central point 310 of the pupil and each candidate boundary line 320, 330, and 340 are calculated. In this case, the average value of the candidate boundary line 330 among the average values of the vector inner product values calculated at each candidate boundary line 320, 330, and 340 is largest and therefore the control module 140 may select the candidate boundary line 330 as the final boundary line of the iris.

In step S21, the control module 140 may use the selected final boundary line to recognize the iris based on the eyeball image data.

As described above, according to the apparatus and method for recognizing an iris in accordance with the embodiments of the present disclosure, it is possible to improve the accuracy of the iris recognition by acquiring the candidate boundary lines of the iris using the method for detecting a candidate boundary line and then confirming the iris boundary line among the candidate boundary lines.

The embodiments of the present disclosure disclosed in the present specification and the accompanying drawings have been provided only as specific examples in order to assist in understanding the present disclosure and do not limit the scope of the present disclosure. Therefore, it is to be understood that in addition to the embodiments of the present disclosure described herein, all the changed or modified forms derived from the technical spirit of the present disclosure are included in the scope of the present disclosure.

What is claimed is:
1. An apparatus for recognizing an iris, comprising:
a camera configured to acquire eyeball image data; and
a control module configured to estimate the iris based on pupil information extracted from the eyeball image data, acquire at least one candidate boundary line for confirming the iris based on the estimated iris, and select a final boundary line from the at least one candidate boundary line,
wherein the iris is recognizable according to the final boundary line, and
wherein the control module confirms a central point of the pupil and calculates a vector inner product of a central point of the pupil and the at least one candidate boundary line to select a candidate boundary line having a largest average value of the vector inner product among the at least one candidate boundary line as the final boundary line.
2. The apparatus according to claim 1, wherein the control module is further configured to apply a thresholding scheme to the eyeball image data to extract a pupil area.
3. The apparatus according to claim 1, wherein the control module is further configured to apply a candidate boundary line detection scheme to the eyeball image data to acquire a boundary line map for the iris.

4. The apparatus according to claim 3, wherein the control module is further configured to remove noise from the boundary line map to acquire the at least one candidate boundary line.

5. A method for recognizing an iris, comprising:
acquiring eyeball image data;
extracting pupil information from the eyeball image data;
estimating the iris based on the pupil information;
acquiring at least one candidate boundary line for confirming the iris based on the estimated iris;
selecting a final boundary line from the at least one candidate boundary line; and
recognizing the iris according to the final boundary line,
wherein the selecting of the final boundary line comprises:
confirming a central point of the pupil;
calculating a vector inner product of the central point of the pupil and the at least one candidate boundary line; and
selecting a candidate boundary line having a largest value of the vector inner product among the at least one candidate boundary line as the final boundary line.

6. The method according to claim 5, wherein the extracting of the pupil information comprises:
extracting a pupil area by applying a thresholding scheme to the eyeball image data.

7. The method according to claim 5, wherein the acquiring of the at least one candidate boundary line comprises:
applying a candidate boundary line detection scheme to the eyeball image data; and
acquiring a boundary line map for the iris.

8. The method according to claim 7, further comprising:
removing noise from the boundary line map.

9. A non-transitory computer readable medium containing program instructions recognizing an iris, the computer readable medium comprising:
program instructions that extract pupil information from acquired eyeball image data;
program instructions that estimate the iris based on the pupil information;
program instructions that acquire at least one candidate boundary line for confirming the iris based on the estimated iris;
program instructions that select a final boundary line from the at least one candidate boundary line; and
program instructions that recognize the iris according to the final boundary line,
wherein the program instructions that select a final boundary line comprises:
program instructions that confirm a central point of the pupil;
program instructions that calculate a vector inner product of the central point of the pupil and the at least one candidate boundary line; and
program instructions that select a candidate boundary line having a largest average value of the vector inner product among the at least one candidate boundary line as the final boundary line.

* * * * *